United States Patent [19]

Scharfe et al.

[11] 3,892,818

[45] July 1, 1975

[54] CATALYTIC CONVERSION OF HYDROCARBON CHLORIDES TO HYDROGEN CHLORIDE AND HYDROCARBONS

[75] Inventors: Gerhard Scharfe, Leverkusen; Rolf-Ernst Wilhelms, Hamburg, both of Germany

[73] Assignee: Bayer Aktiengesellschaft, Leverkusen, Germany

[22] Filed: Dec. 7, 1972

[21] Appl. No.: 313,032

[30] Foreign Application Priority Data
Dec. 23, 1971 Germany............................ 2164074

[52] U.S. Cl.....260/676 R; 260/677 XA; 260/680 XA; 260/683.3; 260/666 R; 260/668 R; 252/455 R; 252/466 R; 252/466 PT
[51] Int. Cl................................................ C07c 9/00
[58] Field of Search......... 260/677 XA, 676, 680 D, 260/683.3, 680 XA, 666, 677 H, 683.41, 668 R; 208/262 R

[56] References Cited
UNITED STATES PATENTS

| | | | |
|---|---|---|---|
| 2,379,697 | 7/1945 | Evans et al. | 260/680 |
| 3,110,742 | 11/1963 | Horok et al. | 260/668 |
| 3,260,767 | 7/1966 | Bajars | 260/680 |
| 3,459,780 | 8/1969 | Wilkinson | 260/429 |
| 3,488,400 | 1/1970 | Candlin | 260/677 |
| 3,493,626 | 2/1970 | Zorn et al. | 260/668 |
| 3,697,615 | 10/1972 | Hughes | 260/677 H |
| 3,792,110 | 2/1974 | Senn | 260/683.3 |

*Primary Examiner*—Delbert E. Gantz
*Assistant Examiner*—Juanita M. Nelson
*Attorney, Agent, or Firm*—Burgess, Dinklage & Sprung

[57] ABSTRACT

The present invention relates to a process for the conversion of hydrocarbon chlorides in the presence of hydrogen to hydrocarbons and hydrogen chloride wherein the process takes place in the gaseous phase and in the presence of rhodium-containing catalysts.

11 Claims, No Drawings

CATALYTIC CONVERSION OF HYDROCARBON CHLORIDES TO HYDROGEN CHLORIDE AND HYDROCARBONS

The present invention relates to converting hydrocarbon chlorides to hydrogen chloride and hydrocarbons.

Chlorinated hydrocarbons are formed as by-products of numerous chemical processes; in general these by-products have no further use and they are destroyed but their destruction, e.g. by burning, involves considerable technical difficulties and great expense. In many cases it is difficult to destroy the hydrocarbon chlorides, particularly in view of the hydrogen chloride thereby evolved, while at the same time observing the regulations concerning spent air and waste water. Thus, the main problem in destroying and disposing of these compounds lies in their chlorine content. It is known that chlorine can quantitatively be removed from halogen compounds by conducting the halogen compounds together with hydrogen over a nickel catalyst at 700°C in the presence of ammonia (Angewandte Chemie, vol. 51, pg. 892 (1938)). In this process 1 mole of ammonia is required for each mole of hydrogen chloride which forms, the hydrogen chloride then being chemically reacted to ammonium chloride. Hence, this process involves considerable technical outlay.

It is accordingly an object of the present invention to overcome the difficulties entailed in destroying hydrocarbon chlorides by converting the hydrocarbon chlorides into chlorine-free hydrocarbons and hydrogen chloride gas so that the hydrocarbons can then be destroyed without any problem, for example by burning. The hydrogen chloride gas can be collected for example by dissolution in water and employed as an aqueous hydrochloric acid for very many different purposes.

We have now found that, pursuant to this object, hydrocarbon chlorides can be converted in an economic way into chloride-free hydrocarbons by a catalytic process wherein hydrocarbon chlorides are reacted in the gaseous phase in the presence of hydrogen and in the presence of catalysts containing rhodium at temperatures in the range of from 50° to 500°C. It was found that catalysts containing rhodium possess high activity for the above-mentioned reaction and that they have a long-life period which is of decisive importance for the continuous technical performance of the process. During the reaction the chlorine contained in the hydrocarbon chlorides is converted into hydrogen chloride and chlorine-free hydrocarbons are also formed. The latter may be saturated or unsatured, aliphatic, cycloaliphatic or aromatic hydrocarbons.

The ratio of the hydrogen to hydrocarbon chloride required for the catalytic conversion can be varied within wide limits. For example, an amount of hydrogen can be used which corresponds to about 0.1 to 10 atoms of hydrogen per atom of chlorine. For example, hydrogen can be employed in an amount which corresponds to about 1 to 10 atoms of hydrogen per atom of chlorine.

Hydrogen can also be used in an amount which corresponds to about 2 to 5 atoms of hydrogen per atom of chlorine. The process can be so carried out that the residual gas which is free of hydrogen chloride contains about 1 to 80 mole % of hydrogen, more particularly about 20 to 60 mole %. It may be advantageous to recycle the non-reacted hydrogen either completely or partially into the reaction after separation of hydrogen chloride and possibly also after separation of chlorine-free hydrocarbons.

The catalytic conversion of the hydrocarbon chlorides can be carried out by means of overall reactions in which larger amounts of hydrogen are reacted, e.g. according to the equation dichloropropane + 2 H$_2$ → propane + 2 HCl The conversion can also be carried out by means of overall reactions in which no hydrogen is reacted, e.g.

chloropropane → propylene + HCl

In these cases it may prove advantageous to employ small amounts of hydroen per atom of chlorine, e.g. about 0.1 to 2 atoms of hydrogen. The conversion can also be carried out by reactions in which hydrogen is produced, e.g. according to the equation chlorocyclohexane → benzene + HCl + 2H$_2$ In this case it may also be advantageous to work with small amounts of hydrogen, for example, using an amount of hydrogen which corresponds to about 0.1 to 10 atoms of hydrogen per atom of chlorine. The process may of course also be performed so that any hydrogen which may be formed during the catalytic conversion is employed for the subsequent reaction.

The most varied hydrocarbon chlorides can be reacted according to the invention. The hydrocarbon chlorides can contain one or more chlorine atoms in the molecule. The hydrocarbon chlorides can contain one more hydrogen atoms as well as the elements C and Cl; however, compounds which only contain carbon and chlorine are also suitable.

For example compounds suitable for the reaction include those having an elementary analysis which shows that they consist of C, Cl and possibly H and which have an organically bound chlorine-content of about 10 to 90 % by weight.

In the process according to the invention it is possible to use, for example, hydrocarbon chlorides containing 1 to about 30 C atoms in which there is at least 1 chlorine atom per molecule.

Compounds with up to 30 C atoms include: saturated or unsaturated, straight-chain or branched-chain, aliphatic and saturated or unsaturated, cycloaliphatic hydrocarbons, optionally substituted by one or several straight-chain or branched chain, saturated or unsaturated aliphatic radicals as well as aromatic hydrocarbons, optionally substituted by one or more straight-chain or branched chain alkyl or alkenyl radicals, one or more H atoms of said hydrocarbons being replaced by chlorine.

The following hydrocarbon chlorides are mentioned as examples of starting compounds which can be used in the reaction according to the invention: monochlormethane, dichloromethane, trichloromethane, tetrachloromethane, monochloroethane, dichloroethane, trichloroethane, tetrachloroethane, pentachloroethane, hexachloroethane, monochloroethylene, dichloroethylene, trichloroethylene, tetrachloroethylene, monochloropropane, dichloropropane, trichloropropane, tetrachloropropane, pentachloropropane, hexachloropropane, heptachloropropane, octachloropropane, monochloropropylene, dichloropropylene, trichloropropylene, tetrachloropropylene, pentachloropropylene, hexachloropropylene, monochlorobutane, dichlorobutane, trichlorobutane, tetrachlorobutane, monochlorobutylene, dichlorobutylene, trichlorobutylene, tetrachlorobutylene, chloropentane, dichloropentane, chlorocyclopentane, dichlorocyclopentane, tetrachloropentane, chlorohexane, dichlorohexane, tetrachlorohexane, chlorohexene, chlorocyclohexane, dichlorocyclohexane, chlorocyclohexene, chlorooctane, chlorohexadecane, chlorinated $C_{20}$-hydrocarbons such as 2-chloro-2-methyl-nonadecane, chlorinated $C_{30}$-hydrocarbons such as chloro-isotriacontane, chlorobenzene, vinyl-chlorobenzene, dichlorobenzene, trichlorobenzene, tetrachlorobenzene, pentachlorobenzene, hexachlorobenzene, chlorotoluene, dichlorotoluene, trichlorotoluene, chloroxylene, dichloroxylene, tetrachloroxylene, chloronaphthalene, diethylchloronaphthalene, chloromethylnaphthalene, benzylchloride and phenyl-stearylchloride; and mixtures of such hydrocarbon chlorides. In particular, mixtures of aliphatic chlorinated hydrocarbons having about 8 to 20 C atoms and/or mixtures of chlorinated aromatic hydrocarbons having about 8 to 20 atoms can be used.

During the reaction according to the invention the following hydrocarbons can be formed for example: methane, ethane, ethylene, propane, propylene, butane, butylene, pentane, pentene, cyclopentane, hexane, hexene, cyclohexane, heptane, heptene, octane, decane, $C_{20}$-hydrocarbons such as 2-methylnonadecane, $C_{30}$-hydrocarbons such as isotriacontane, benzene, toluene, styrene, naphthalene, heptadecanyl-benzene, as well as hydrocarbon mixtures, for example, mixtures of aliphatic hydrocarbons having about 8 to 20 C atoms and/or mixtures of aromatic hydrocarbons having about 8 to 20 C atoms.

Pure hydrocarbon chlorides can be used in the reaction; however work can be carried out with mixtures of the most different hydrocarbon chlorides.

The reaction can be carried out in the temperature range of about 50° to 500°C. and in particular the reaction can be carried out at temperatures of about 100° to 400°C. It may be advantageous to perform the reaction in the temperature range of about 150° to 350°C. The reaction can be carried out at normal, reduced or elevated pressure. Suitable pressures are, for example, about 1 to 10 pressures gauge. Both pressure and temperature should be selected so that the starting mixture is in the gaseous phase at the start of the reaction. It is advantageous to carry out the reaction in the absence of oxygen. The starting hydrogen can be pure hydrogen, e.g. electrolytic hydrogen. However, mixtures of hydrogen with inert gases, for example, methane, argon and nitrogen can be used, e.g. hydrogen fractions which are recovered during the catalytic or thermal conversion of mineral oils.

Hydrogen can also be used which contains hydrocarbon chloride. The starting materials can be used in anhydrous form; however, products can also be used which contain small amounts of water, for example, in a quantity corresponding to the solubility of water at room temperature in the hydrocarbon chlorides employed. In order to avoid corrosion when carrying out the process on a large scale it is expedient to use anhydrous or almost anhydrous starting materials.

Suitable catalysts are those which contain at least a catalytic amount of rhodium in the form of a rhodium compound or as the metal. It is advantageous to employ the rhodium applied to a carrier. Carrier catalysts can be used which contain the rhodium in the form of compounds or as metal. Rhodium can be contained as the sole catalytically active component in the catalyst, but catalysts can also be used which contain other metals or metal compounds as well as rhodium, for example, the metals or compounds of the elements palladium, platinum, ruthenium, iridium, iron, cobalt, nickel, copper, gold, vanadium, chromium, molybdenum and tungesten. The catalyst can also contain compounds of different elements, for example, salts or hydroxides or carboxylates, such as, acetates, of the alkali metals and alkaline-earth metals, as well as salts or oxides of aluminum, boron and titanium. For the production of catalysts the most varied carrier materials can be used, for example, aluminum oxide, silicic acid, aluminum silicate, spinal, active charocal and titanium dioxide. It is advantageous to use carriers which are chemically resistant towards halogen hydracids. The carriers can possess the most varied physical properties. For example, the inner surface area can be between about 1 and 500 $m^2/g$.

The most varied rhodium compounds can be used as starting materials for the production of catalysts containing rhodium, for example, rhodium-(III)-oxide hydrate, potassium hexachlororhodiate, ammonium hexachlororhodiate, rhodium oxide hydrate, rhodium-III-acetate, rhodium-(III)-chloride hydrate, rhodium sulfate, rhodium phosphate and sodium rhodium nitrite. In many cases it is advantageous to start with the water-soluble and generally accessible rhodium-III-chloride hydrate. When halogen-free rhodium compounds are used as starting materials for the production of the catalysts this rhodium-III-chloride hydrate can, for example, be first reacted in an aqueous solution with sodium hydroxide; a rhodium oxide hydrate is thereby precipitated which, after washing to remove water-soluble halogen compounds, can be reacted with acetic acid to form a solution of rhodium acetate in acetic acid.

The production of the rhodium-containing catalysts can be carried out in very many ways. For example, aqueous solution of rhodium-III-chloride hydrate or acetic or aqueous solutions of rhodium acetate can be applied to the carrier by soaking following by drying. The resulting catalysts can be used directly for the reaction or they can be first reacted to form other compounds by further chemical or thermal treatment. For example, after application of rhodium chloride hydrate by soaking and subsequent drying, a solution of alkali metal hydroxide, e.g. sodium hydroxide or potassium hydroxide, can be applied by soaking, and conversion to the oxide hydrate of rhodium can be achieved on the carrier. The resulting catalysts can be freed of chlorine compounds by washing with water, after which the catalyst is dried and is then ready for use in the reaction. After application of a rhodium acetate solution by soaking and subsequent drying by heating, the rhodium acetate can be decomposed and a catalyst is obtained comprising rhodium oxide on the carrier. In the event that rhodium be introduced to the reaction as rhodium metal, the rhodium compounds applied to the carrier or produced thereon by chemical or thermal treatment, for example, rhodium chloride, rhodium oxide, rhodium oxide hydrate and rhodium acetate, can be reduced to the metal by the action of reducing agents, e.g. by treatment with hydrogen. The catalysts which contain rhodium compounds can also be introduced into the reaction and the reduction to rhodium metal carried out in the reactor during the subsequent reaction with hydrogen. Should the catalysts contain other metals or metal compounds in addition to rhodium, the production can be carried out so that solutions of rhodium salts and other metal salts, e.g. sodium palladium chloride, tetrachloroauric acid, hexachloro platinic acid, iron-III-chloride, chromic acid, sodium vanadate, sodium tungstate or potassium molybdate, are applied to the carrier by soaking and after drying the resulting catalysts are used as such or first converted into other compounds, e.g., oxides or hydroxides by thermal treatment or chemical reaction. By treatment with reducing agents, e.g. hydrogen, a partial or complete conversion to the metals can be performed prior to introduction into the reaction or during the reaction. Finally, it is possible to first apply to the carrier metal compounds which do not contain rhodium, to convert these compounds, if desired, by thermal treatment or by chemical reaction and then in a second stage to apply the rhodium compounds by soaking.

The rhodium content in the catalyst can be varied within wide limits. It can be for example about 0.01 to 5 % by weight. Particularly suitable are, for example, rhodium contents of about 0.1 to 1 % by weight. Should additions of other metals or metal compounds be made to the rhodium, then for example, 0.1 to 10 parts of the added metals or metal compounds can be employed per part by weight of rhodium (calculated as metal).

It may be advantageous to carry out the reaction of hydrocarbon chlorides with hydrogen to produce hydrocarbons and hydrocarbon halides in tubular reactors and to conduct the gaseous starting materials over the catalyst which is stationary in the reaction tubes. The reaction tubes can, for example, have lengths of about 2 to 8 m and inner diameters of about 20 to 50 mm. The catalysts can have a particular size of, for example, about 3 to 8 mm. When using tubular reactors the reaction heat can be drawn off in conventional manner, e.g. by boiling water under pressure, and recovered in the form of high pressure-steam.

The process can also be carried out in tubular reactors and the reaction heat only partly conducted off, e.g. by means of air coolers, so that the reactor exit has a higher temperature than the reactor entrance. The temperature of the reactor entry can, for example, be about 150°C and the exit temperature 350°C.

In continuous commercial production it is possible when working with liquid hydrocarbon halides to introduce them into an evaporator and to conduct hydrogen at a suitable evaporator temperature through the liquid hydrocarbon halides. The mixture of hydrogen and hydrocarbon halides can then be heated up to the reaction temperature and conducted over the catalyst at this temperature. The gaseous reaction product can be cooled, for example to a temperature of about 20° to 50°C. The reaction product contains the non-reacted hydrogen, the formed hydrocarbon and the formed hydrogen chloride. In cases where the hydrogen also contains inert gases, such as methan or nitrogen, these are also present in the reaction product. The reaction can be carried out so that the hydrocarbon halides are completely reacted in a straight throughput. It may be advantageous to select the conditions such that the hydrocarbon halides are only partly reacted in a straight throughput e.g. about 70 to 90 %. In this case the non-reacted hydrocarbon halides can be separated from the reaction product. The process can be so carried out for example that after cooling of the reaction gas and compression, the non-reacted hydrocarbon chlorides are separated off in the liquid phase and then recycled to the reaction, so that eventually all the hydrocarbon chlorides are completely converted into chlorine-free hydrocarbons and hydrogen chloride. However, after cooling and optionally after compression it is also possible to remove the nonreacted hydrocarbon chlorides from the reaction gases by countercurrent washing with an organic solvent and upon regeneration of the washing agent, e.g. by distillation, to recover the non-reacted hydrocarbon chlorides and to recycle them to the reaction.

The reaction gas of the process according to the invention contains, optionally after separation of any non-reacted hydrocarbon chloride, hydrogen, the chlorine-free hydrocarbons and hydrogen chloride. This gas can either be employed for chemical reactions in which hydrogen chloride is required, or the hydrogen chloride can be removed in conventional manner, for example by washing, e.g. with water, to produce a residual gas consisting of hydrogen and chlorine-free hydrocarbon for further use or combustion.

During the reaction of the hydrocarbon chlorides with hydrogen in the process according to the invention, small amounts of hydrocarbon chlorides are produced as by-products which possess a smaller number of chlorine atoms per molecule than the starting material. These chlorinated hydrocarbons may be separated from the reaction gas and recycled to the reaction so that chlorine-free hydrocarbons are obtained in the end but in some cases this is difficult and involves considerable technical outlay. In these cases it may be more expedient by suitable selection of the working conditions, such as pressure, temperature, hydrogen/hydrocarbon chloride ratio and throughput, to control the reaction so that these hydrocarbon chlorides, which have a lower number of chlorine atoms per molecule than the starting material, are not produced.

In cases in which chlorinated hydrocarbons, which possess fewer chlorine atoms per molecule than the starting material, are not produced, then the chlorinated hydrocarbons employed can be entirely or partially reacted. Where incomplete conversion is achieved in a straight throughput, the non-reacted hydrocarbon chlorides can be separated by a conventional technique from the reaction gas and recycled to the reaction and thus completely reacted in the end. Where separation of the non-reacted hydrocarbon chlorides is difficult or technically complicated, then it may be epedient to select such working conditions which will result in a complete reaction to chlorine-free hydrocarbons in a straight throughput.

It may be advantageous to activate the carriers used for the reaction prior to the production of the catalysts, for example by treatment with aqueous or gaseous hydrogen chloride. It may further be advantageous to activate the carriers or the catalysts after application of the rhodium by treatment with aqueous or dry hydrogen chloride and/or by treatment with alkali or alkaline-earth metal hydroxides or alkali or alkaline earth metal salts. Before reacting with hydrocarbon halides, the catalysts can be activated by drying and/or treatment with hydrogen and/or treatment with mixtures of hydrogen and hydrogen chloride.

When initiating the reaction the catalyst which contains the rhodium as the metal or metal compound, can be introduced into the reactor, freed of oxygen by rinsing with nitrogen; the catalyst is then heated in the hyrogen steam to the reaction temperature or to a temperature above the reaction temperature, e.g. to temperatures of about 150° to 500°C, then adjusted to the reaction temperature in the hydrogen stream and the reaction can then be started by the addition of hydrocarbon chlorides. Prior to introduction the hydrocarbon chlorides can be freed of dissolved oxygen and/or any water which may be present. For example, any water can be azeotropically removed in a distillation column and oxygen-free and anhydrous hydrocarbon chloride removed from the column as a branch stream and introduced into the reaction.

When working in th absence of water or under practially anhydrous conditions it is possible to use normal steel as the reactor material, since in the presence of dry hydrogen chloride no corrosion takes place.

The process of the invention is distinguished by the use of a particularly active catalyst which also has a long catalytic life-period, a fact of importance when conducting the process on a large scale. The process of the invention can be so executed that no carbon deposition or practically no carbon deposition occurs on the catalyst. By this means a long life-period of the catalyst can be achieved and frequent regeneration of the catalyst which is undesirable from a technical point of view can be avoided.

The invention is further described in the following lustrative examples wherein all parts are by weight unless otherwise expressed.

EXAMPLE 1

A rhodium-containing catalyst was manufactured as follows:

An aqueous solution of rhodium-III-chloride hydrate was applied by soaking to aluminum oxide having a particle size of approximately 5 mm. The resulting treatment aluminum oxide carrier was dried and subjected to a hydrogen stream at 250°C for 2 hours. The finished catalyst contained 1 % by wt. of rhodium on the aluminum oxide carrier. 1 liter of the catalyst was placed in a reaction tube of 25 mm internal diameter and 2.5 m length. 1 mole of dichloropropane and 3.5 moles of hydrogen were conducted over the catalyst hourly at normal pressure and at a temperature of 80°C. A complete conversion was obtained according to the equation.

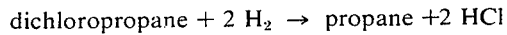

dichloropropane + 2 H$_2$ → propane +2 HCl

The test was carried out over a period of 400 hours. During this test period no subsidence of catalytic activity was observed so that even at the end of this test complete reaction to propane and hydrogen chloride took place.

EXAMPLE 2

The process was carried out as described in Example 1, except that a mixture of 4 moles of 1,2-dichloropropane and 14 moles of hydrogen were conducted hourly over the catalyst. 95 % of the supplied dichloropropane were reacted to propane and HCl, 5% of the dichloropropane were not reacted. Monochlorinated hydrocarbons were not formed. The non-reacted dichloropropane was separated by condensation off from the gas leaving the reactor and recycled to the reaction.

EXAMPLE 3

The process was performed as described in Example 1, except that a catalyst was used which contained 0.1 % by wt. of rhodium and the reaction was carried out at a temperature of 250°C instead of 180°C. 98% of the 1,2-dichloropropane employed reacted to form a mixture of propylene and propane and HCl. 2% of the dichloropropane did not react and monochlorinated hydrocarbons were not formed.

EXAMPLE 4

The process was performed as described in Example 1, except that 1 mole of chlorobenzene and 10 moles of hydrogen were conducted hourly over the catalyst. A quantitative conversion to cyclohexane and hydrogen chloride took place.

EXAMPLE 5

The process was carried out as described in Example 4, except that 1 mole of carbon tetrachloride was used instead of the chlorobenzene. A quantitative reaction to methane and hydrogen chloride was achieved.

The same results were obtained when, instead of carbon tetrachloride, trichloromethane, dichloromethane or monochloromethane were used.

EXAMPLE 6

The process was carried out as described in Example 4, except that 1 mole of dichlorobutene was used instead of chlorobenzene. A complete reaction to n-butane and HCl took place.

EXAMPLE 7

The process was carried out as described in Example 1, except that the following catalysts were used:
a. 0.9 % by wt. of rhodium and 0.1 % palladium on aluminum oxide;
b. 0.9 % by wt. of rhodium and 0.1 % platinum on aluminum oxide;
c. 0.9 % by wt. of rhodium and 0.1 % gold on aluminum oxide;
d. 0.9 % by wt. of rhodium and 0.1 % nickel on aluminum oxide;
e. 1 % by wt. of rhodium on lithium aluminum spinel.
The same values were obtained as in Example 1.

EXAMPLE 8

The process was carried out as described in Example 3, except that the reaction was carried out at 350°C. The dichloropropane employed was completely converted to HCl and a mixture of propylene and propane converted in a ratio of about 2:1.

EXAMPLE 9

The process was carried out as described in Example 8 except that a catalyst was used which contained 0.1 % of rhodium on activated charcoal (particle size 4 mm). The dichloropropane employed was completely converted to HCl and a mixture of propylene and propane. The test was carried out over a period of 1000 hours. During the test period no subsidence of catalyst activity was detected so that a complete reaction took place even at the end of the test.

It will be appreciated that the instant specification and examples are set forth by way of illustration and not limitation, and that various modifications and changes may be made without departing from the spirit and scope of the present invention.

What is claimed is:

1. A process for the catalytic conversion of a hydrocarbon chloride into a chlorine-free hydrocarbon, said hydrocarbon chloride being selected from the group consisting of a saturated aliphatic hydrocarbon, an unsaturated aliphatic hydrocarbon, a saturated cycloaliphatic hydrocarbon, an unsaturated cycloaliphatic hydrocarbon, a saturated aliphatic hydrocarbon substituted by at least one saturated aliphatic radical, a saturated aliphatic hydrocarbon substituted by at least one unsaturated aliphatic radical, an unsaturated aliphatic hydrocarbon substituted by at least one saturated aliphatic radical, an unsaturated hydrocarbon substituted by at least one saturated aliphatic radical, an unsaturated aliphatic hydrocarbon substituted by at least one unsaturated aliphatic radical, a saturated cycloaliphatic hydrocarbon substituted by at least one saturated aliphatic radical, a saturated cycloaliphatic hydrocarbon substituted by at least one unsaturated aliphatic radical, an unsaturated cycloaliphatic hydrocarbon substituted by at least one saturated aliphatic radical, an unsaturated cycloaliphatic hydrocarbon substituted by at least one unsaturated aliphatic radical, an aromatic hydrocarbon, an aromatic hydrocarbon substituted by at least one alkyl radical, and an aromatic hydrocarbon substituted by at least one alkenyl radical, at least one H atom of said hydrocarbon being replaced by chlorine, comprising contacting the hydrocarbon chloride in the gas phase with hydrogen in the presence of rhodium as catalyst and at a temperature of about 50° to 500°C.

2. The process according to claim 1, wherein the content of organically bound chlorine in the hydrocarbon chloride is about 10 to 90% by weight.

3. The process according to claim 1, wherein the hydrocarbon chloride contains 1 to about 30 C atoms.

4. The process according to claim 1, wherein the hydrocarbon chloride is 1,2-dichloropropane.

5. The process according to claim 1, wherein the catalyst comprises about 0.01 to 5% by weight of rhodium on a carrier.

6. The process according to claim 5, wherein the catalyst further comprises at least one metal selected from the group consisting of palladium, platinum, ruthenium, iridium, iron, cobalt, nickel, copper, gold, vanadium, chromium, molybdenum and tungsten, said metal being present in about 0.1 to 10 times the weight of the rhodium.

7. The process according to claim 5, wherein the catalyst further comprises at least one member selected from the group consisting of salts, hydroxides and carboxylates of alkali metal and alkaline earth metals and salts and oxides of aluminum, boron and titanium.

8. The process according to claim 5, wherein the carrier comprises aluminum oxide, silicic acid, aluminum silicate, spinel or titanium dioxide.

9. The process according to claim 5, wherein the carrier comprises active charcoal.

10. The process according to claim 7, wherein the hydrocarbon chloride is substantially anhydrous, the content of organically bound chlorine in the hydrocarbon chloride is about 10 to 90% by weight, about 2 to 5 atoms of hydrogen are supplied per atom of chlorine in the hydrocarbon chloride, the reaction is effected at a temperature of about 150° to 350°C in the absence of oxygen, the carrier comprises aluminum oxide, silicic acid, aluminum silicate, spinel, active charcoal or titanium dioxide, the catalyst further comprises at least one member selected from the group consisting of salts, hydroxides and carboxylates of alkali metal and alkaline earth metals and salts and oxides of aluminum, boron and titanium, and after separation of hydrogen chloride unreacted hydrogen is recycled at least in part.

11. The process according to claim 1, wherein the hydrocarbon chloride is dichloropropane.

* * * * *